(12) United States Patent
Ucar et al.

(10) Patent No.: US 11,548,515 B2
(45) Date of Patent: Jan. 10, 2023

(54) SYSTEMS AND METHODS FOR MANAGING DRIVER HABITS

(71) Applicant: Toyota Motor Engineering & Manufacturing North America, Inc., Plano, TX (US)

(72) Inventors: Seyhan Ucar, Mountain View, CA (US); Xuewei Qi, Dublin, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 113 days.

(21) Appl. No.: 17/155,913

(22) Filed: Jan. 22, 2021

(65) Prior Publication Data

US 2022/0194390 A1     Jun. 23, 2022

Related U.S. Application Data

(60) Provisional application No. 63/129,183, filed on Dec. 22, 2020.

(51) Int. Cl.
*B60W 40/09* (2012.01)
*B60W 50/14* (2020.01)
(Continued)

(52) U.S. Cl.
CPC ........ *B60W 40/09* (2013.01); *B60W 50/0097* (2013.01); *B60W 50/14* (2013.01);
(Continued)

(58) Field of Classification Search
None
See application file for complete search history.

(56) References Cited

U.S. PATENT DOCUMENTS

| 10,407,079 | B1 | 9/2019 | Chan et al. |
| 2016/0307285 | A1 | 10/2016 | Gallagher |

(Continued)

FOREIGN PATENT DOCUMENTS

| CA | 2968645 | 7/2016 |

OTHER PUBLICATIONS

Kim et al., "Interrupting Drivers for Interactions: Predicting Opportune Moments for In-Vehicle Proactive Auditory-Verbal Tasks," Proc. ACM Interact. Mob. Wearable Ubiquitous Technol., vol. 2, No. 4, Article 175, Dec. 2018, found at: https://kimauk.github.io/file/paper/IMWUT18_Interruptibility.pdf.

(Continued)

*Primary Examiner* — Thomas S Mccormack
(74) *Attorney, Agent, or Firm* — Christopher G. Darrow; Darrow Mustafa PC

(57) ABSTRACT

Systems and methods for managing driver habits are disclosed herein. One embodiment learns undesirable driving habits of a driver over time as the driver operates a vehicle; identifies, for each learned undesirable driving habit, one or more situational triggers associated with that undesirable driving habit; receives information from one or more of vehicle sensors and one or more external sources; predicts that the driver will engage in a particular undesirable driving habit; and carries out one or more of the following avoidance strategies to assist the driver in refraining from engaging in the particular undesirable driving habit: communicating one or more speed advisories to the driver; suggesting an alternate route to the driver; and presenting the driver with one or more of a coupon, an offer, and a discount at a place of business to encourage the driver to take a break by stopping at the place of business.

16 Claims, 4 Drawing Sheets

(51) Int. Cl.
 B60W 50/00 (2006.01)
 G06Q 30/02 (2012.01)
 G06N 20/00 (2019.01)
(52) U.S. Cl.
 CPC ......... *G06N 20/00* (2019.01); *G06Q 30/0235* (2013.01); *B60W 2050/143* (2013.01); *B60W 2540/229* (2020.02); *B60W 2540/30* (2013.01)

(56) References Cited

U.S. PATENT DOCUMENTS

| | | | |
|---|---|---|---|
| 2018/0009442 A1 | 1/2018 | Spasojevic et al. | |
| 2019/0025853 A1* | 1/2019 | Julian | G06V 10/25 |
| 2019/0038204 A1* | 2/2019 | Beck | A61B 5/024 |
| 2019/0049267 A1* | 2/2019 | Huang | G01C 21/3415 |

OTHER PUBLICATIONS

Tchankue et al., "Using Machine Learning to Predict the Driving Context whilst Driving," ACM, 2013, found at https://www.researchgate.net/profile/Patrick_Tchankue2/publication/255964077_Using_Machine_Learing_to_Predict_the_Driving_Context_whilst_Driving/links/0a85e531dc0441b932000000/Using-Machine-Learning-to-Predict-the-Driving-Context-whilst-Driving.pdf.

Wang et al., "Online Prediction of Driver Distraction Based on Brain Activity Patterns," IEEE Transactions on Intelligent Transportation Systems, vol. 16, No. 1, Feb. 2015, found at https://www.researchgate.net/profile/Wanpracha_Chaovalitwongse/publication/267154789_Online_Prediction_of_Driver_Distraction_Based_on_Brain_Activity_Patterns/links/54d264f70cf25017917df30a/Online-Prediction-of-Driver-Distraction-Based-on-Brain-Activity-Patterns.pdf.

Alam et al., "Real-Time Distraction Detection Based on Driver's Visual Features," 2019 International Conference on Electrical, Computer and Communication Engineering (ECCE), Feb. 7-9, 2019.

"Reduce Distracted Driving with Real-Time In-Vehicle AI," Nauto, 2019, available at https://nauto-public.s3.amazonaws.com/Resources/Nauto_Reduce+Distracted+Driving+with+Real-Time+In-Vehicle+AI_Whitepaper.pdf.

Nishigaki et al., "Driver Attention Level Estimation Using Driver Model Identification," 2019 IEEE Intelligent Transportation Systems Conference (ITSC) Auckland, NZ, Oct. 27-30, 2019.

Ramos et al., "Understanding Daily Car Use: Driving Habits, Motives, Attitudes, and Norms Across Trip Purposes," Transportation Research Part F 68 (2020), Elsevier, pp. 306-315, available at https://www.sciencedirect.com/science/article/pii/S1369847819302165/pdfft?md5=5fb2018f2103f50d0c0d016133776e24&pid=1-s2.0-S1369847819302165-main.pdf.

* cited by examiner

SYSTEMS AND METHODS FOR MANAGING DRIVER HABITS

CROSS-REFERENCE TO RELATED APPLICATION

This application claims the benefit of U.S. Provisional Patent Application No. 63/129,183, "Systems and Methods for Managing Driver Habits," filed Dec. 22, 2020, which is incorporated by reference herein in its entirety.

TECHNICAL FIELD

The subject matter described herein generally relates to vehicles and, more particularly, to systems and methods for managing driver habits.

BACKGROUND

Bad (unsafe) driving habits among motor vehicle drivers are common, leading to many of the accidents that occur. For example, a particular driver may have the habit of daydreaming or otherwise driving while in a distracted state of mind, tailgating, or jumping red lights (proceeding through an intersection before a traffic light has changed from red to green) Eliminating bad driving habits is challenging because, often, the driver is not even consciously aware of them.

SUMMARY

An example of a system for managing driver habits is presented herein. The system comprises one or more processors and a memory communicably coupled to the one or more processors. The memory stores a learning module including instructions that when executed by the one or more processors cause the one or more processors to learn undesirable driving habits of a driver over time as the driver operates a vehicle and to identify, for each learned undesirable driving habit, one or more situational triggers associated with that undesirable driving habit. The memory also stores a prediction module including instructions that when executed by the one or more processors cause the one or more processors to receive information from one or more of vehicle sensors and one or more external sources and to predict that the driver will engage in a particular undesirable driving habit based on identification, in the received information, of at least one of the one or more situational triggers associated with the particular undesirable driving habit. The memory also stores a mitigation module including instructions that when executed by the one or more processors cause the one or more processors to carry out one or more of the following avoidance strategies to assist the driver in refraining from engaging in the particular undesirable driving habit: (1) communicating one or more speed advisories to the driver to minimize a number of stops for red lights at a series of traffic signals along a current route; (2) suggesting an alternate route to the driver; and (3) presenting the driver with one or more of a coupon, an offer, and a discount at a place of business to encourage the driver to take a break from driving by stopping at the place of business.

Another embodiment is a non-transitory computer-readable medium for managing driver habits and storing instructions that when executed by one or more processors cause the one or more processors to learn undesirable driving habits of a driver over time as the driver operates a vehicle. The instructions also cause the one or more processors to identify, for each learned undesirable driving habit, one or more situational triggers associated with that undesirable driving habit. The instructions also cause the one or more processors to receive information from one or more of vehicle sensors and one or more external sources. The instructions also cause the one or more processors to predict that the driver will engage in a particular undesirable driving habit based on identification, in the received information, of at least one of the one or more situational triggers associated with the particular undesirable driving habit. The instructions also cause the one or more processors to carry out one or more of the following avoidance strategies to assist the driver in refraining from engaging in the particular undesirable driving habit: (1) communicating one or more speed advisories to the driver to minimize a number of stops for red lights at a series of traffic signals along a current route; (2) suggesting an alternate route to the driver; and (3) presenting the driver with one or more of a coupon, an offer, and a discount at a place of business to encourage the driver to take a break from driving by stopping at the place of business.

Another embodiment is a method of managing driver habits. The method includes learning undesirable driving habits of a driver over time as the driver operates a vehicle. The method also includes identifying, for each learned undesirable driving habit, one or more situational triggers associated with that undesirable driving habit. The method also includes receiving information from one or more of vehicle sensors and one or more external sources. The method also includes predicting that the driver will engage in a particular undesirable driving habit based on identification, in the received information, of at least one of the one or more situational triggers associated with the particular undesirable driving habit. The method also includes carrying out one or more of the following avoidance strategies to assist the driver in refraining from engaging in the particular undesirable driving habit: (1) communicating one or more speed advisories to the driver to minimize a number of stops for red lights at a series of traffic signals along a current route; (2) suggesting an alternate route to the driver; and (3) presenting the driver with one or more of a coupon, an offer, and a discount at a place of business to encourage the driver to take a break from driving by stopping at the place of business.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
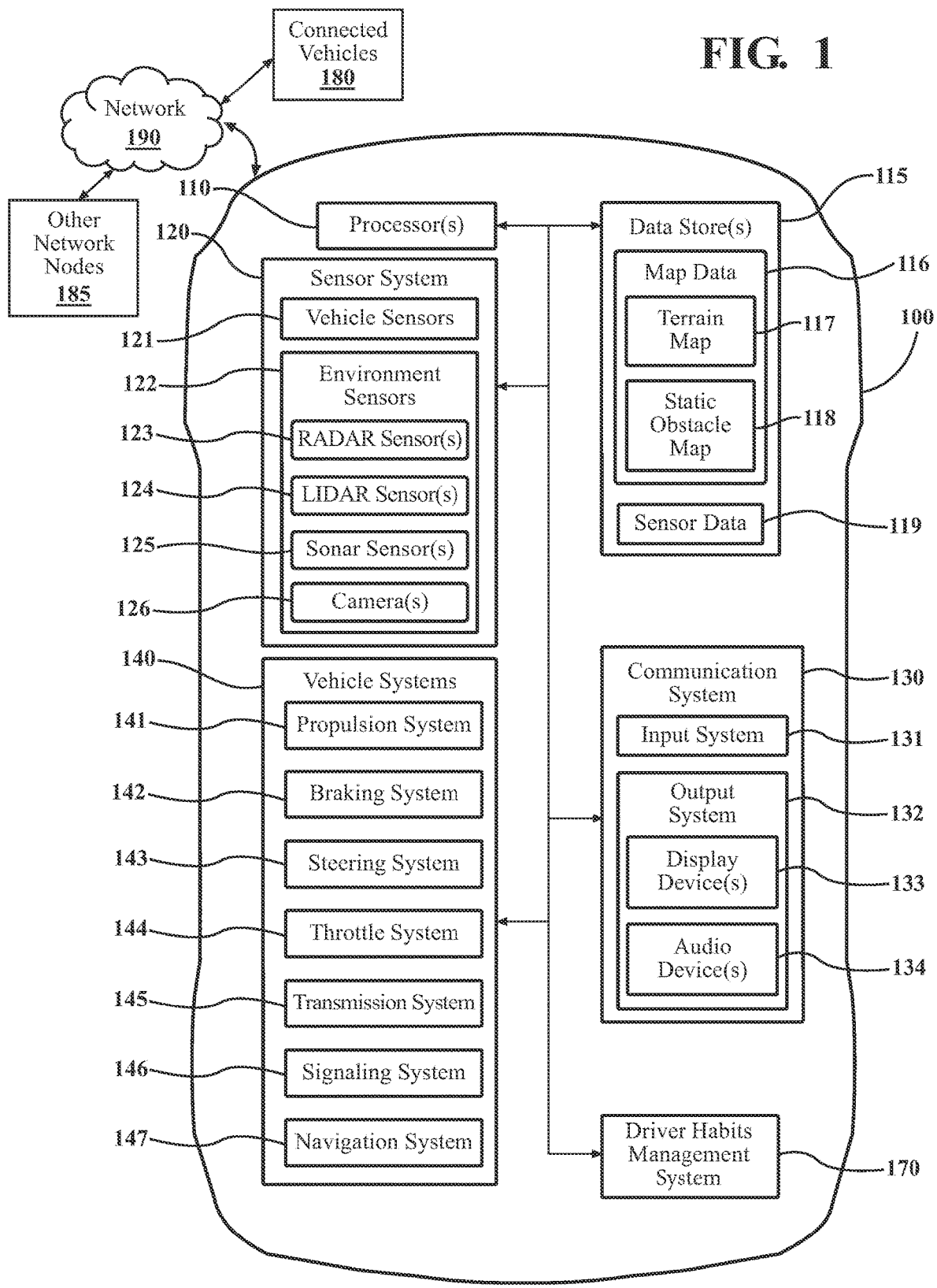
FIG. 1 illustrates one embodiment of a vehicle within which systems and methods disclosed herein may be implemented.

Conventional systems that attempt to address bad driving habits (hereinafter "undesirable driving habits") alert or warn the driver as soon as an undesirable driving habit such as distracted driving has been detected. This approach has at least two drawbacks. First, since it is reactive, it does not help the driver to avoid engaging in the undesirable driving habit in the first place. This drawback stems from the driver's undesirable driving habits not being correlated with the traffic situations in which they are likely to be repeated. Second, immediately alerting a driver of a detected undesirable driving habit such as daydreaming (a type of distracted driving) can be dangerous. For example, issuing an audible warning such as "You are daydreaming!" might startle the driver and cause the driver to flinch, resulting in an accident.

Various embodiments described herein overcome the above drawbacks of conventional systems by managing the undesirable driving habits smoothly (unobtrusively) without endangering the driver or other road users. Moreover, the embodiments described herein can proactively assist a driver in refraining from engaging in undesirable driving habits and can, over time, even aid the driver in retraining his or her driving habits to be safer.

In embodiments, a driver habits management system in a vehicle automatically learns a particular driver's undesirable driving habits over time as the driver operates the vehicle, and the system also identifies, for each learned undesirable driving habit, one or more situational triggers associated with that undesirable driving habit. For example, the system may learn that a particular driver tends to become distracted (e.g., daydreams) late in the afternoon in rainy weather while waiting at a traffic light, when the driver's heartrate is between 95 and 162 beats per minute (BPM). In this example, the undesirable driving habit is distracted driving, and the situational triggers include the time of day (late in the afternoon), weather conditions (rainy), waiting at a traffic light (traffic context/situation), and the driver's heartrate being within a particular range (physiologic or biometric data from the driver).

Once the system has learned a driver's undesirable driving habits and the situations or contexts in which the driver tends to engage in them, the system can process information from various sources such as vehicle sensors and/or external sources such as servers, other connected vehicles, or roadside units (RSUs) to predict, based on identification in the received information of the associated situational triggers, that the driver is likely to engage in a particular undesirable driving habit.

Once the system has predicted that the driver is likely to engage in a particular undesirable driving habit, the system can carry out one or more of the following avoidance strategies to assist the driver in refraining from engaging in the particular undesirable driving habit: (1) communicating one or more speed advisories to the driver to minimize the number of stops the vehicle has to make for red lights at a series of traffic signals along the vehicle's current route; (2) suggesting an alternate route to the driver; and (3) presenting the driver with a coupon, an offer, and/or a discount at a place of business to encourage the driver to take a break from driving by stopping at the place of business. In some embodiments, these avoidance strategies can be carried out in succession until the driver accepts a particular avoidance strategy. The order in which the avoidance strategies are carried out can, in some embodiments, be based on the driver's learned preferences. In some embodiments, these avoidance strategies are generated according to the driver's learned driving habits, and they are intended to help the driver break the undesirable driving habits.

In some embodiments, information regarding the learned undesirable driving habits and their associated situational triggers is uploaded to a cloud or edge server to enable the cloud or edge server to provide the in-vehicle driver habits management system with information pertaining to relevant situational triggers (e.g., weather conditions that lie ahead along a planned route, information regarding the timing of traffic lights along the current route, traffic flow (speed) data, or traffic-density information). In some embodiments, a cloud or edge server can suggest or recommend, to the in-vehicle system, a particular avoidance strategy based on information that is available at the cloud or edge server.

Referring to FIG. 1, an example of a vehicle 100, in which systems and methods disclosed herein can be implemented, is illustrated. The vehicle 100 can include a driver habits management system 170 or components and/or modules thereof. As used herein, a "vehicle" is any form of motorized land transport. For example, in some embodiments, the vehicle 100 is an automobile. In some embodiments, the vehicle 100 may include an internal combustion engine (ICE). In other embodiments, vehicle 100 may be an electric or a hybrid ICE/electric vehicle. The vehicle 100 can include the driver habits management system 170 or capabilities to support or interact with the driver habits management system 170 and thus benefits from the functionality discussed herein. Instances of vehicle 100, as used herein, are equally applicable to any machine capable of incorporating the systems or methods described herein.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including driver habits management system 170. While the various elements are shown as being located within the vehicle 100 in FIG. 1, it will be understood that one or more of these elements can be located external to the vehicle 100 or be part of a system that is separate from vehicle 100. Further, the elements shown may be physically separated by large distances.

As shown in FIG. 1, vehicle 100 may, in some embodiments, communicate with one or more other connected vehicles 180 via a network 190. Also, in some embodiments, as shown in FIG. 1, vehicle 100 may communicate with other network nodes 185 such as cloud servers, edge servers, and roadside units (RSUs) via network 190.

In FIG. 1, network 190 represents any of a variety of wired and wireless networks. For example, in communicating directly with another vehicle, sometimes referred to as vehicle-to-vehicle (V2V) communication, vehicle 100 can employ a technology such as dedicated short-range communication (DSRC) or Bluetooth Low Energy (BLE). In communicating with a cloud or edge server or a RSU, vehicle 100 can use a technology such as cellular data. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
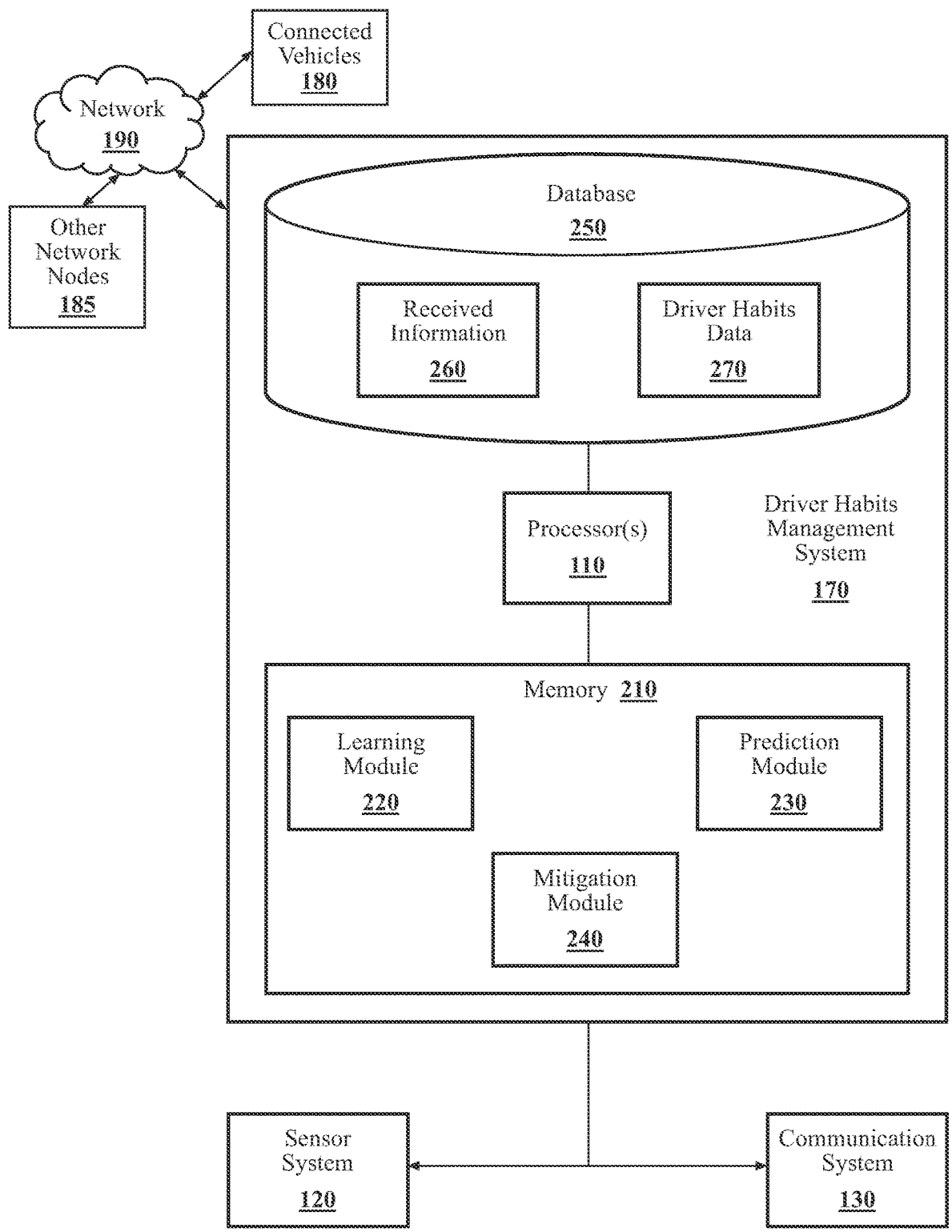
FIG. 2 illustrates one embodiment of a driver habits management system.

Referring to FIG. 2, it illustrates one embodiment of a driver habits management system 170. Driver habits management system 170 is shown as including one or more processors 110 from the vehicle 100 of FIG. 1. Accordingly, the one or more processors 110 may be a part of the driver habits management system 170, the driver habits management system 170 may include a separate processor from the one or more processors 110 of the vehicle 100, or the driver habits management system 170 may access the one or more processors 110 through a data bus or another communication path. In one embodiment, the driver habits management system 170 includes a memory 210 that stores a learning module 220, a prediction module 230, and a mitigation module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that, when executed by the one or more processors 110, cause the one or more processors 110 to perform the various functions disclosed herein.

As shown in FIG. 2, driver habits management system 170 can communicate with one or more connected vehicles 180 and with other network nodes 185 via network 190. In some embodiments, driver habits management system 170 communicates with one or more connected vehicles 180 via V2V connections, as discussed above. In some embodiments, driver habits management system 170 communicates with one or more other network nodes 185 (e.g., cloud or edge servers, RSUs, etc.) via a cellular-data connection, as discussed above. In some embodiments, driver habits management system 170 may communicate with other systems or subsystems of vehicle 100 such as sensor system 120 and communication system 130. Driver habits management system 170 can store, in database 250, received information 260 from sensor system 120 and/or one or more external sources such as cloud or edge servers, RSUs, or other connected vehicles 180. Driver habits management system 170 can also store various kinds of driver habits data 270 in database 250.

Learning module 220 generally includes instructions that when executed by the one or more processors 110 cause the one or more processors 110 to (1) learn undesirable driving habits of a driver over time as the driver operates a vehicle and (2) identify, for each learned undesirable driving habit, one or more situational triggers associated with that undesirable driving habit. In some embodiments, these two actions are performed simultaneously (e.g., in parallel).

Learning a driver's undesirable driving habits and correlating situational triggers with them as the driver is operating a vehicle 100 includes recognizing undesirable driving habits as they occur. This can be accomplished in different ways, depending on the embodiment. In general, this involves comparing, in real time, the driver's performance in controlling vehicle 100 with a reference or standard that represents "expected" or "normal" driving behavior (steering, braking, accelerating, use of turn signals, etc.), under the circumstances, and documenting or storing, in some way, a record of the detected undesirable driving habits for future use. The reference for comparison can be the product of a machine-learning-based process, or the reference can be rules-based, depending on the implementation.

For example, as the driver is operating vehicle 100, if vehicle 100 begins to follow another vehicle at a distance that is smaller than what the reference indicates is safe, learning module 220 flags that behavior as an undesirable driving habit—specifically, "tailgating" or some other label. Simultaneously, learning module 220 identifies the situational triggers that are associated with the detected undesirable driving habit. Examples of situational triggers include, without limitation, weather conditions, time of day, day of the week, a spatial relationship between the vehicle 100 and another vehicle (e.g., the following distance in the example just mentioned), a spatial relationship between the vehicle and a topological feature (e.g., an intersection, particular lane, etc.) of a roadway, traffic density, the speed of traffic flow along a particular portion of a roadway, signal phase and timing (SPaT) data associated with one or more traffic signals, and the status of the driver's biometric or physiologic data (e.g., heartrate, respiration, brainwaves, etc.). In some embodiments, learning module 220 uses the driver's calendar or schedule information to determine when and where the driver's appointments and other scheduled activities will take place and, in some embodiments, the destinations or locations associated with those scheduled activities.

In general, a situational trigger is a piece of information about a driving context or situation that correlates with an undesirable driving habit of the driver. A situational trigger can pertain to the environment or physical world surrounding the vehicle, or it can pertain to the driver's own physiologic status or state of mind. For example, learning module 220 may observe that the driver tends to tailgate during a morning commute when the flow of traffic is a certain percentage below the posted speed limit. In this example, the situational triggers are time of day (morning), a particular intended destination (the driver's commute to work), and the speed of traffic flow falling below a learned threshold.

Learning module 220 can be configured to detect a variety of different kinds of undesirable driving habits, including, without limitation, distracted driving, daydreaming (a specific type of distracted driving), tailgating (following a preceding vehicle too closely), failure to activate a turn signal when making a turn, usage of a mobile electronic device such as a smartphone in a distracting way, jumping a traffic light (proceeding through an intersection before a red light has turned to green), running a red traffic light, and risky overtaking of another vehicle (e.g., passing a vehicle on a two-lane highway where there is a double-yellow line).

In learning a driver's undesirable driving habits and associated situational triggers, learning module 220 analyzes data from sensor system 120. Referring again to FIG. 1, sensor system 120, in some embodiments, includes a variety of different kinds of vehicle sensors 121 such as camera(s) 126, Light Detection and Ranging (LIDAR) sensor(s) 124, RADAR sensor(s) 123, and sonar sensor(s) 125. Depending on the embodiment, some of the vehicle sensors can be interior (i.e., inside the passenger compartment of vehicle 100), and others are exterior (outside the passenger compartment). For example, one or more interior cameras can be used to monitor the driver's gaze direction, facial expressions, distracting use of mobile electronic devices, attentiveness or alertness level, etc. In some embodiments, the interior vehicle sensors include physiologic or biometric sensors to monitor the driver's heartrate, respiration, brainwaves, or other characteristics (e.g., estimated emotional state) that can be correlated or associated as situational triggers with the driver's detected undesirable driving habits. Additional vehicle sensors 121 can include those associated with the vehicle's Controller Area Network (CAN bus) to measure speed, acceleration, pose/heading, etc., and positioning sensors such as a global navigation satellite system (GNSS) receiver that outputs the vehicle's location as Global Positioning System (GPS) coordinates. Vehicle sensors 121 can also include an electronic clock and calendar (for time of day and day of week) and an interface to access a driver's calendar data (e.g., via the driver's smartphone or other portable electronic device or via the driver's account on a cloud server).

To detect and learn an undesirable driving habit like daydreaming, learning module 220 can, for example, analyze the driver's gaze to detect that the driver's attention is "stuck" (fixated) at a particular location in the environment other than where the driver's gaze would be expected, given the current circumstances. In some embodiments, analysis of brain-wave patterns and changes in brain-wave patterns can also be used to detect that the driver is daydreaming. As discussed above, learning module 220 can associate one or more situational triggers (time of day, traffic context, etc.) with the detected daydreaming state.

The various vehicle sensors 121 mentioned above enable learning module 220 to compare the driver's performance with the predetermined reference representing "normal" or "expected" driving behavior, under the circumstances. The vehicle sensors 121 also enable learning module 220 to associate one or more situational triggers with each undesirable driving habit.

In some embodiments, learning module 220 stores information regarding observed undesirable driving habits and their respective associated situational triggers in a set of feature maps. In such an embodiment, each feature map associates a particular undesirable driving habit (e.g., jumping a traffic light) with one or more situational triggers. Each undesirable driving habit can have multiple feature maps associated with it. For example, one feature map might associate the situational triggers "location: intersection of Apple St. and 3rd Avenue," and "time of day: late night" with the undesirable driving habit "jumping a traffic light." Another feature map might associate the situational triggers "driver stressed by being late for appointment" and "traffic light 'red' duration exceeds a threshold" with the same undesirable driving habit—"jumping a traffic light."

Learning module 220 can be implemented in different ways, depending on the particular embodiment. In some embodiments, a rules-based approach is employed. In other embodiments, machine learning, reinforcement learning, and/or time-series analysis are employed. For example, in performing time-series analysis, learning module 220 might employ a long short-term memory (LSTM) recurrent neural network (RNN).

In some embodiments, learning module 220 includes further instructions to upload, to a cloud or edge server, information regarding the undesirable driving habits of the driver and the one or more situational triggers associated with each undesirable driving habit. How the uploaded information can be used, in various embodiments, is discussed below in connection with prediction module 230 and mitigation module 240.

Prediction module 230 generally includes instructions that when executed by the one or more processors 110 cause the one or more processors 110 to receive information from vehicle sensors 121, one or more external sources, or both and to predict that the driver will engage in a particular undesirable driving habit based on identification, in the received information, of at least one of the one or more situational triggers associated with that particular undesirable driving habit. The received information 260 can include or be based on any of a variety of different kinds of sensor data output by vehicle sensors 121, such those discussed above in connection with learning module 220. The information derived from vehicle sensors 121 can include, for example, speed data for the vehicle 100, location data for the vehicle 100, heading data for the vehicle 100, speed data associated with one or more other road users (e.g., vehicles, motorcycles, pedestrians, cyclists), heading data associated with the one or more other road users, and distance data associated with the one or more other road users (e.g., measured distances from vehicle 100 to those other road users).

The received information 260 can also include information from one or more external sources such as cloud servers, edge servers, RSUs, and other connected vehicles. Prediction module 230 can receive a variety of different kinds of information from these external sources. Examples include weather data, SPaT data associated with one or more traffic signals, traffic-density data, traffic flow (speed) data, and location data (e.g., GPS coordinates) associated with other road users in the vicinity of or along the planned route of vehicle 100.

Prediction module 230 can identify situational triggers associated with learned undesirable driving habits among the various kinds of information it receives from vehicle sensors 121 and/or the external sources. Identification of one or more associated situational triggers can be the basis for prediction module 230 to predict that the driver is likely to engage in a particular undesirable driving habit in the near future. The time horizon for prediction can vary, depending on the embodiment, the particular traffic situation, and the nature of the specific undesirable driving habit. For example, in one scenario, prediction module 230 may identify situational triggers associated with tailgating, and prediction module 230 may estimate that the driver will engage in that behavior within the next 10 seconds. In another scenario, prediction module 230 may identify one or more situation triggers associated with distracted driving, but the traffic situation in which the driver is likely to engage in the behavior, based on learned patterns, lies five minutes ahead along the vehicle's current planned route. Regardless of these situational variations in the prediction time horizon, mitigation module 240 can smoothly assist the driver in refraining from engaging in the particular undesirable driving habit. Mitigation module 240 does this by proactively attempting to help the driver avoid altogether a learned situation in which the driver is likely to engage in the undesirable driving habit. This is discussed in greater detail below.

In one embodiment, to predict a driver's undesirable driving habits, prediction module 230 employs a machine-learning-based algorithm. More specifically, prediction module 230 can employ a regressive aspect of an algorithm used by learning module 220 to learn the undesirable driving habits and their associated situational triggers. In another embodiment, prediction module 230 employs a rules-based approach to predict the driver's undesirable driving habits. One example of a machine-learning-based architecture for learning and predicting undesirable driving habits is discussed below in connection with FIG. 3.

Mitigation module 240 generally includes instructions that when executed by the one or more processors 110 cause the one or more processors 110 to carry out one or more of the following avoidance strategies to assist the driver in refraining from engaging in the particular undesirable driving habit: (1) communicating one or more speed advisories to the driver to minimize the number of stops the vehicle has to make for red lights at a series of traffic signals along the vehicle's current route; (2) suggesting an alternate route to the driver; and (3) presenting the driver with a coupon, an offer, and/or a discount at a place of business to encourage the driver to take a break from driving by stopping at the place of business. Each of the three foregoing avoidance strategies (or mitigation strategies) just mentioned can assist a driver in avoiding a situation in which the driver is likely to engage in an undesirable driving habit. This smooth, unobtrusive approach to guiding driver behavior obviates the need to issue a direct warning or alert after the undesirable driving habit has already commenced, which could startle or confuse the driver, impacting safety.

As discussed above, in some embodiments, these avoidance strategies and other avoidance strategies are generated according to the driver's learned driving habits, and they are intended to help the driver break the undesirable driving habits.

Communicating speed advisories to the driver can help the driver to avoid engaging in undesirable driving habits (running red lights, jumping a traffic light, daydreaming, etc.) in relation to stopping for traffic lights. Mitigation module 240, based on SPaT data for a series of upcoming traffic lights received from a cloud or edge server, can advise the driver at what speed to drive to minimize the number of stops the vehicle 100 has to make for red lights along the planned route. This helps the driver to avoid situations (i.e., stopping for red lights) in which the driver is likely to engage in the kinds of undesirable driving habits mentioned above.

Another avoidance strategy is for mitigation module 240 to suggest an alternate route to the driver. If prediction module 230 predicts that the driver will engage in a particular undesirable driving habit at a point ahead along the planned or predicted route, mitigation module 240 can suggest an alternate route to the driver to avoid the potential upcoming situation in which the driver is likely to engage in the undesirable driving habit. For example, if prediction module 230 predicts that the driver is likely to tailgate (follow another vehicle too closely) while vehicle 100 is traveling in a particular lane (e.g., the rightmost lane) due to slow traffic, mitigation module 240 might suggest that the driver change lanes before the driver begins the tailgating behavior. To name another example, if prediction module 230 predicts, based on one or more identified situational triggers, that the driver is likely to turn at an intersection ahead without activating a turn signal, mitigation module 240 might suggest that the driver take an alternate route in which the driver proceeds straight instead to avoid the situation in which the driver is expected to engage in the undesirable driving habit (i.e., failing to activate the turn signal).

Another avoidance strategy is for mitigation module 240 to present the driver (e.g., on an in-dash display) with a coupon, an offer, and/or a discount at a place of business to encourage the driver to take a break from driving by stopping at the place of business. For example, mitigation module 240 can cause a special offer from the driver's favorite coffee shop to appear on the display. This avoidance strategy has wide applicability to a variety of different kinds of undesirable driving habits.

In one embodiment, mitigation module 240 carries out the most feasible avoidance strategy for the particular undesirable driving habit predicted by prediction module 230. For example, prediction module 230 might predict that a driver is likely to daydream within the next two minutes, based on certain situational triggers associated with that habit. Mitigation module 240 ascertains that it is not feasible to present the driver with speed advisories because the driver is on a rural highway without traffic lights, nor is it feasible to offer the driver coupons, incentives, etc., for a place of business because the nearest business is 45 miles away. In this case, mitigation module 240 would choose to suggest an alternate route as the most feasible strategy.

In some embodiments, mitigation module 240 attempts to carry out each of the above three avoidance strategies in succession until the driver accepts a particular avoidance strategy. For example, mitigation module 240 might determine that the driver is not heeding the speed advisories. At that point, mitigation module 240 can instead suggest an alternate route. If the driver declines the alternate route, mitigation module 240 can then present a coupon, offer, or discount, as described above. The order in which these avoidance strategies are attempted can vary, depending on the embodiment. In one embodiment, the avoidance strategies are prioritized in accordance with the driver's past preferences. For example, if the driver typically follows speed advisories but is reluctant to accept a suggested alternate route, mitigation module 240 can favor speed advisories as the first or preferred attempted avoidance strategy.

In some embodiments, a cloud or edge server, in providing information regarding weather conditions, traffic speed and/or density, location data for other road users, etc., can suggest a particular avoidance strategy to mitigation module 240. For example, if information at the server indicates that traffic flow is going to become sluggish at a particular location along the vehicle's current planned or predicted route, the server might recommend to mitigation module 240 that an alternate route be suggested to the driver to avoid the driver's known habit of tailgating in heavy, slow-traffic situations. Mitigation module 240 can then, by default, adopt the suggested avoidance strategy, or mitigation module 240 can take into account the recommendation from the server as part of its decision-making algorithm, depending on the embodiment.

This ability of a cloud or edge server to recommend or suggest a particular avoidance strategy to mitigation module 240 in a vehicle 100 is one reason that, in some embodiments, learning module 220 uploads information pertaining to a driver's undesirable driving habits and associated situational triggers to the cloud or edge server, as discussed above. Another reason is that a cloud or edge server can share information with prediction module 230 that enables prediction module 230 to identify situational triggers and thereby predict that a driver is likely to engage in an undesirable driving habit. For example, when the server detects situational triggers (e.g., a rainstorm eight minutes ahead along the current route late in the afternoon) that pertains to a learned undesirable driving habit of a specific driver, the server can share that information with the relevant driver's in-vehicle driver habits management system 170, specifically with prediction module 230. That transmitted information enables prediction module 230 to predict the undesirable driving habit (e.g., becoming distracted while waiting for a long red light during a rainstorm in the late afternoon) and enables mitigation module 240 to execute one or more avoidance strategies, possibly in succession, to avoid the triggering traffic situation.

Figure 3:
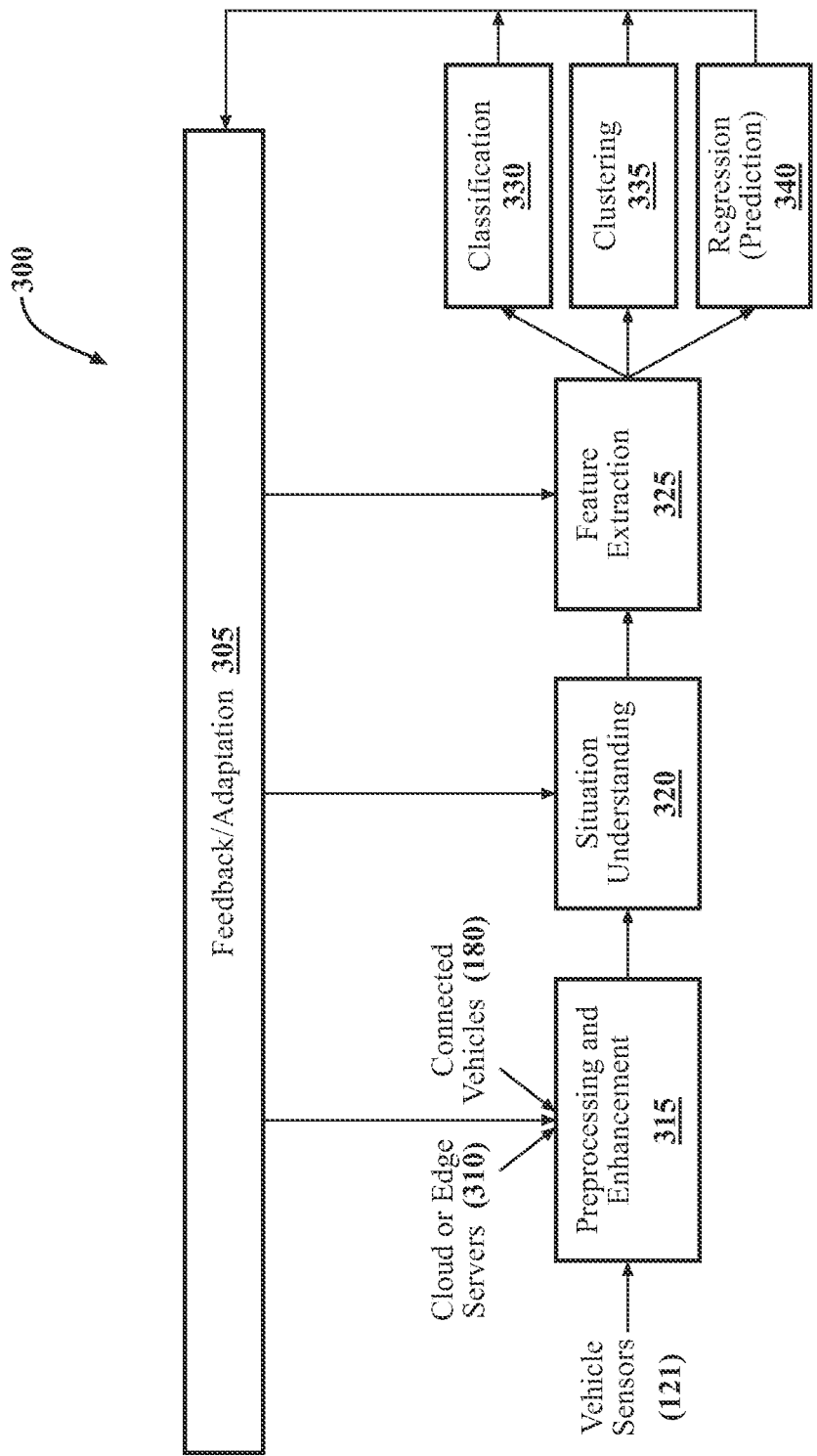
FIG. 3 is a block diagram of a driver-habits learning architecture, in accordance with an illustrative embodiment of the invention.

FIG. 3 is a block diagram of a driver-habits learning architecture 300, in accordance with an illustrative embodiment of the invention. FIG. 3 shows one example of a machine-learning-based implementation of some aspects of learning module 220 and prediction module 230. As shown in FIG. 3, driver-habits learning architecture 300 gathers information from vehicle sensors 121, cloud or edge servers 310, and connected vehicles 180 for preprocessing and enhancement 315. This information is fed to situation understanding 320. Situation understanding 320 includes object detection and understanding traffic situations (e.g., that the vehicle 100 should stop at a red light at the intersection vehicle 100 is approaching). Feature extraction 325 feeds classification 330, clustering 335, and regression (prediction) 340. Classification 330 is an aspect of learning a driver's particular undesirable driving habits—classifying the driver's behavior as "aggressive," "distracted," "daydreaming," "tailgating," etc. Clustering 335 identifies features that are common across various categories of undesirable driving habits, such as weather conditions, time of day, day of week, traffic density, etc. These are examples of the situational triggers that driver habits management system 170 (specifically, learning module 220) correlates with the driver's undesirable driving habits to support regression (prediction) 340, which corresponds to prediction module 230. The outputs of classification 330, clustering 335, and regression (prediction) 340 are fed to feedback/adaptation 305.

As discussed above, the machine-learning aspects of driver-habits learning architecture 300 can be implemented in various ways, depending on the embodiment. For example, in some embodiments, regression (prediction) 340 involves time-series analysis, in which a LSTM might be employed.

Figure 4:
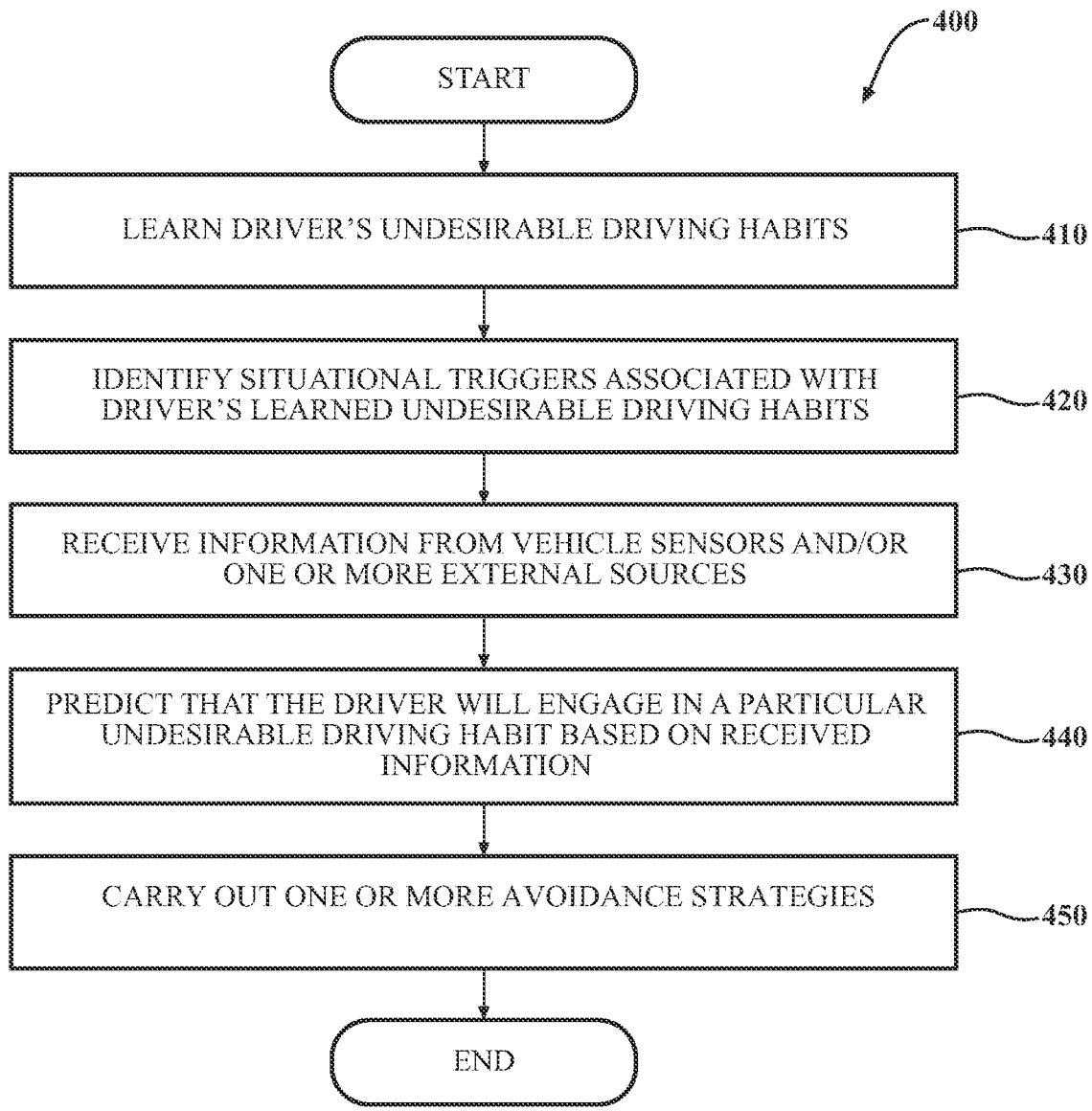
FIG. 4 is a flowchart of a method of managing driver habits, in accordance with an illustrative embodiment of the invention.

FIG. 4 is a flowchart of a method 400 of managing driver habits, in accordance with an illustrative embodiment of the invention. Method 400 will be discussed from the perspective of the driver habits management system 170 shown in FIG. 2. While method 400 is discussed in combination with driver habits management system 170, it should be appreciated that method 400 is not limited to being implemented within driver habits management system 170, but driver habits management system 170 is instead one example of a system that may implement method 400.

At blocks 410 and 420, learning module 220 learns undesirable driving habits of a driver over time as the driver operates a vehicle 100 (block 410) and identifies, for each learned undesirable driving habit, one or more situational triggers associated with that undesirable driving habit (block 420). As discussed above, in some embodiments, these two actions are performed simultaneously (e.g., in parallel). Learning module 220 identifies undesirable driving habits by comparing the driver's performance, in real time, against a reference or standard that represents "normal" or "expected" driving behavior, under the circumstances. Learning module 220 correlates these undesirable driving habits with various kinds of situational triggers, as discussed above. Learning module 220 can be implemented in different ways, depending on the embodiment. As also discussed above, in some embodiments a rules-based approach is employed. In other embodiments, machine learning, reinforcement learning, and/or time-series analysis are employed. For example, in performing time-series analysis, learning module 220 might employ a LSTM RNN.

At blocks 430 and 440, prediction module 230 receives information from vehicle sensors 121, one or more external sources (e.g., cloud or servers, RSUs, etc.), or both (block 430) and predicts that the driver will engage in a particular undesirable driving habit based on identification, in the received information, of at least one of the one or more situational triggers associated with that particular undesirable driving habit (block 440). As discussed above, to predict a driver's undesirable driving habits, prediction module 230 can employ a machine-learning-based algorithm, in some embodiments. More specifically, prediction module 230 can employ a regressive aspect of an algorithm used by learning module 220 to learn the undesirable driving habits and their associated situational triggers, as discussed above. In another embodiment, prediction module 230 employs a rules-based approach to predict the driver's undesirable driving habits. One example of a machine-learning-based architecture for learning and predicting undesirable driving habits is discussed above in connection with FIG. 3.

At block 450, mitigation module 240 carries out one or more of the following avoidance strategies to assist the driver in refraining from engaging in the particular undesirable driving habit: (1) communicating one or more speed advisories to the driver to minimize the number of stops the vehicle has to make for red lights at a series of traffic signals along the vehicle's current route; (2) suggesting an alternate route to the driver; and (3) presenting the driver with a coupon, an offer, and/or a discount at a place of business to encourage the driver to take a break from driving by stopping at the place of business. As discussed above, in some embodiments, these avoidance strategies and other avoidance strategies are generated according to the driver's learned driving habits, and they are intended to help the driver break the undesirable driving habits.

In some embodiments, method 400 includes additional actions (not shown in FIG. 4). For example, in some embodiments, information regarding the learned undesirable driving habits and their associated situational triggers is uploaded to a cloud or edge server 310 to enable the cloud or edge server 310 to provide the in-vehicle driver habits management system 170 (specifically, prediction module 230) with information pertaining to relevant situational triggers (e.g., weather conditions that lie ahead along a planned route, SPaT data for traffic lights along the current or planned route, traffic flow data, or traffic-density information). In some embodiments, a cloud or edge server 310 can suggest or recommend, to mitigation module 240, a particular avoidance strategy based on information that is available at the cloud or edge server 310. Mitigation module 240 can receive this suggestion or recommendation over network 190.

As discussed above, in one embodiment, mitigation module 240 carries out the most feasible avoidance strategy for the particular undesirable driving habit predicted by prediction module 230.

As also discussed above, in some embodiments, mitigation module 240 attempts to carry out each of the above three avoidance strategies (see discussion of block 450) in succession until the driver accepts a particular avoidance strategy. For example, mitigation module 240 might determine that the driver is not heeding the speed advisories. At that point, mitigation module 240 might instead suggest an alternate route. If the driver declines the alternate route, mitigation module 240 can then present a coupon, offer, or discount, as described above. The order in which these avoidance strategies are attempted can vary, depending on the embodiment. In one embodiment, the avoidance strategies are prioritized in accordance with the driver's demonstrated preferences during past drives. For example, if the driver typically follows speed advisories but is reluctant to accept a suggested alternate route, mitigation module 240 can favor speed advisories as the first or preferred attempted avoidance strategy.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100. The one or more processors 110 may control some or all of these vehicle systems 140.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for managing driver habits, the system comprising:
one or more processors; and
a memory communicably coupled to the one or more processors and storing:
a learning module including instructions that when executed by the one or more processors cause the one or more processors to:
learn undesirable driving habits of a driver over time as the driver operates a vehicle; and
identify, for each learned undesirable driving habit, one or more situational triggers associated with that undesirable driving habit;
a prediction module including instructions that when executed by the one or more processors cause the one or more processors to:
receive information from one or more of vehicle sensors and one or more external sources; and
predict that the driver will engage in a particular undesirable driving habit based on identification, in the received information, of at least one of the one or more situational triggers associated with the particular undesirable driving habit; and
a mitigation module including instructions that when executed by the one or more processors cause the one or more processors to attempt to carry out the following avoidance strategies in succession until the driver accepts a particular avoidance strategy to assist the driver in refraining from engaging in the particular undesirable driving habit and to learn which avoidance strategies the driver prefers so that the avoidance strategies are prioritized accordingly as the avoidance strategies are attempted to be carried out in succession:
communicating one or more speed advisories to the driver to minimize a number of stops for red lights at a series of traffic signals along a current route;
suggesting an alternate route to the driver; and
presenting the driver with one or more of a coupon, an offer, and a discount at a place of business to encourage the driver to take a break from driving by stopping at the place of business.

2. The system of claim 1, wherein the particular undesirable driving habit includes one of distracted driving, daydreaming, tailgating, failure to activate a turn signal, usage of a mobile electronic device, jumping a traffic light, running a red traffic light, and risky overtaking of another vehicle.

3. The system of claim 1, wherein the one or more situational triggers associated with the particular undesirable driving habit include one or more of weather conditions, time of day, day of week, a spatial relationship between the vehicle and another vehicle, a spatial relationship between the vehicle and a topological feature of a roadway, traffic density, speed of traffic flow, signal phase and timing data associated with one or more traffic signals, and a status of driver biometric data.

4. The system of claim 1, wherein the learning module includes further instructions that when executed by the one or more processors cause the one or more processors to upload, to one of a cloud server and an edge server, information regarding the undesirable driving habits of the driver and the one or more situational triggers associated with each undesirable driving habit.

5. The system of claim 1, wherein the instructions in the learning module to learn undesirable driving habits of the driver over time as the driver operates the vehicle include instructions to perform one or more of machine learning, reinforcement learning, and time-series analysis.

6. The system of claim 1, wherein the mitigation module includes instructions that when executed by the one or more processors cause the one or more processors to carry out a particular avoidance strategy that is most feasible based on the particular undesirable driving habit.

7. The system of claim 1, wherein the mitigation module includes further instructions that when executed by the one or more processors cause the one or more processors to receive a suggested avoidance strategy from one of a cloud server and an edge server.

8. A non-transitory computer-readable medium for managing driver habits and storing instructions that when executed by one or more processors cause the one or more processors to:
learn undesirable driving habits of a driver over time as the driver operates a vehicle;
identify, for each learned undesirable driving habit, one or more situational triggers associated with that undesirable driving habit;
receive information from one or more of vehicle sensors and one or more external sources;
predict that the driver will engage in a particular undesirable driving habit based on identification, in the received information, of at least one of the one or more situational triggers associated with the particular undesirable driving habit; and
attempt to carry out the following avoidance strategies in succession until the driver accepts a particular avoidance strategy to assist the driver in refraining from engaging in the particular undesirable driving habit and learn which avoidance strategies the driver prefers so that the avoidance strategies are prioritized accordingly as the avoidance strategies are attempted to be carried out in succession:
communicating one or more speed advisories to the driver to minimize a number of stops for red lights at a series of traffic signals along a current route;
suggesting an alternate route to the driver; and
presenting the driver with one or more of a coupon, an offer, and a discount at a place of business to encourage the driver to take a break from driving by stopping at the place of business.

9. The non-transitory computer-readable medium of claim 8, wherein the instructions include further instructions that when executed by the one or more processors cause the one or more processors to upload, to one of a cloud server and an edge server, information regarding the undesirable driving habits of the driver and the one or more situational triggers associated with each undesirable driving habit.

10. A method of managing driver habits, the method comprising:
learning undesirable driving habits of a driver over time as the driver operates a vehicle;
identifying, for each learned undesirable driving habit, one or more situational triggers associated with that undesirable driving habit;
receiving information from one or more of vehicle sensors and one or more external sources;
predicting that the driver will engage in a particular undesirable driving habit based on identification, in the received information, of at least one of the one or more situational triggers associated with the particular undesirable driving habit; and
attempting to carry out the following avoidance strategies in succession until the driver accepts a particular avoidance strategy to assist the driver in refraining from engaging in the particular undesirable driving habit and learning which avoidance strategies the driver prefers so that the avoidance strategies are prioritized accordingly as the avoidance strategies are attempted to be carried out in succession:

communicating one or more speed advisories to the driver to minimize a number of stops for red lights at a series of traffic signals along a current route;

suggesting an alternate route to the driver; and presenting the driver with one or more of a coupon, an offer, and a discount at a place of business to encourage the driver to take a break from driving by stopping at the place of business.

11. The method of claim 10, further comprising uploading, to one of a cloud server and an edge server, information regarding the undesirable driving habits of the driver and the one or more situational triggers associated with each undesirable driving habit.

12. The method of claim 10, wherein the one or more external sources include one or more of a cloud server, an edge server, a roadside unit, and another vehicle and the information received from the one or more external sources includes one or more of weather data, signal phase and timing data associated with one or more traffic signals, traffic-density data, traffic flow data, and location data associated with other road users.

13. The method of claim 10, wherein the information received from the vehicle sensors includes one or more of speed data for the vehicle, location data for the vehicle, heading data for the vehicle, speed data associated with one or more other road users, heading data associated with the one or more other road users, and distance data associated with the one or more other road users.

14. The method of claim 10, wherein learning undesirable driving habits of the driver over time as the driver operates the vehicle includes one or more of machine learning, reinforcement learning, and time-series analysis.

15. The method of claim 10, wherein a particular avoidance strategy that is most feasible, based on the particular undesirable driving habit, is carried out.

16. The method of claim 10, further comprising receiving a suggested avoidance strategy from one of a cloud server and an edge server.

\* \* \* \* \*